United States Patent
Kuo et al.

(10) Patent No.: US 8,261,051 B2
(45) Date of Patent: Sep. 4, 2012

(54) COMPUTER, BOOTING SOFTWARE PRODUCT AND COMPUTER BOOTING METHOD

(75) Inventors: Chen-Chin Kuo, Taipei (TW);
Chien-Hung Chen, Taipei (TW);
Chih-Lung Lin, Taipei (TW)

(73) Assignee: ASUSTek COMPUTER Inc., Taipei (TW)

( * ) Notice: Subject to any disclaimer, the term of this patent is extended or adjusted under 35 U.S.C. 154(b) by 438 days.

(21) Appl. No.: 12/507,803

(22) Filed: Jul. 23, 2009

(65) Prior Publication Data

US 2010/0077192 A1 Mar. 25, 2010

(30) Foreign Application Priority Data

Sep. 19, 2008 (TW) .............................. 97136092 A

(51) Int. Cl.
*G10H 1/18* (2006.01)

(52) U.S. Cl. .............................. 713/1; 713/2; 713/100

(58) Field of Classification Search .................. 713/1, 2, 713/100
See application file for complete search history.

(56) References Cited

U.S. PATENT DOCUMENTS

| 7,231,514 | B2 * | 6/2007 | Geeng | 713/2 |
| 2004/0130557 | A1 * | 7/2004 | Lin et al. | 345/619 |
| 2006/0005006 | A1 * | 1/2006 | Tung | 713/2 |
| 2006/0236081 | A1 * | 10/2006 | Hung et al. | 713/1 |
| 2007/0110408 | A1 * | 5/2007 | Chang et al. | 386/126 |
| 2007/0121581 | A1 * | 5/2007 | Tricaud | 370/352 |
| 2008/0010447 | A1 | 1/2008 | Liao | |
| 2008/0172502 | A1 * | 7/2008 | Wu | 710/33 |
| 2009/0249054 | A1 * | 10/2009 | Yu | 713/2 |

FOREIGN PATENT DOCUMENTS

| CN | 1424650 | 6/2003 |
| CN | 1504875 | 6/2004 |
| CN | 1797340 | 7/2006 |
| CN | 1831772 | 9/2006 |

* cited by examiner

*Primary Examiner* — M Elamin
(74) *Attorney, Agent, or Firm* — Jianq Chyun IP Office

(57) ABSTRACT

A computer includes an application system, a storage device and a basic input output system (BIOS). The application system can be respectively coupled to the storage device and the BIOS, set at least a multimedia file as a preset playing file according to an input instruction and store the preset playing file into the storage device. The application system can further generate a log file according to the input instruction and the storage position of the preset playing file, wherein the log file is sent to the BIOS. The BIOS has a file access module, so that the BIOS can acquire the preset playing file from the storage device according to the log file for playing during booting the computer.

19 Claims, 15 Drawing Sheets

COMPUTER, BOOTING SOFTWARE PRODUCT AND COMPUTER BOOTING METHOD

CROSS-REFERENCE TO RELATED APPLICATION

This application claims the priority benefit of Taiwan application serial no. 97136092, filed on Sep. 19, 2008. The entirety of the above-mentioned patent application is hereby incorporated by reference herein and made a part of this specification.

BACKGROUND OF THE INVENTION

1. Field of the Invention

The present invention generally relates to a procedure for booting a computer, and more particularly, to a booting procedure able to play a user-defined A/V (audio/video) during booting a computer.

2. Description of Related Art

FIG. 1A is a block diagram showing an architecture of a conventional computer. Referring to FIG. 1A, a conventional computer 100 includes a central processing unit (CPU) 102, a chipset 104, a memory 106 and a basic input output system (basic input output system) 108, wherein the CPU 102 is coupled to the chipset 104 and then to memory 106 and the BIOS 108 via the chipset 104.

The chipset 104 includes a northbridge chip 112 and a southbridge chip 114, wherein the northbridge chip 112 is coupled to the CPU 102, and the CPU 102 is coupled to the memory 106 and the southbridge chip 114 via the northbridge chip 112. Besides, the southbridge chip 114 is coupled to the BIOS 108. During booting the computer 100, the CPU 102 loads a program code in the BIOS 108 into the memory 106 through the chipset 104 to execute the program code so as to accomplish a booting procedure.

FIG. 1B is a block diagram showing an architecture of a conventional basic input output system. Referring to FIGS. 1 and 2, the conventional BIOS 108 includes a booting block 122 and a main program segment 126. When booting the computer 100, at first, the program code in the booting block 122 is executed so as to decompress the program code in the main program segment 126 and load the decompressed code into the memory 106 via the chipset 104. In general, the data in the booting block 122 is an uncompressed data and the data in the main program segment 126 may be a compressed data. When the data in the booting block 122 is executed, the main program segment 126 is decompressed and the decompressed code is loaded into the memory 106 via the chipset 104 for executing.

It is well known a BIOS is in charge of power-on-self-test (POST), initializing, recording the system setting values, providing a runtime program library and assisting loading an operation system. During booting a computer, a user would face a screen full of a succession of testing text messages, which makes the user feel the booting procedure is a bored and very monotone job.

SUMMARY OF THE INVENTION

Accordingly, the present invention is directed to a computer able to play user-defined multimedia files during booting the computer.

The present invention is also directed to a booting software product, which is able to extract and play multimedia files with high resolution stored in a storage device during booting a computer in the stage prior to entering an OS.

The present invention is also directed to a computer booting method, which enables a user to select a plurality of multimedia files and play different multimedia files according to a selection mode whenever booting the computer.

The present invention provides a computer, which includes an application system, a storage device and a BIOS. The application system is respectively coupled to the storage device and the BIOS and can set at least a multimedia file as a preset playing file according to an input instruction and store the preset playing file into the storage device. The application system further generates a log file sent to the BIOS according to the storage position of the preset playing file and the mode setting of the user. The BIOS has a file access module, which is able to acquire a preset playing file for playing from the storage device according to the log file during booting the computer.

On the other hand, the present invention provides a booting software product of a computer. The software system includes an application system, a BIOS and a format-converting module. The application system includes an interface module, which is for setting at least a multimedia file as a preset playing file according to an input instruction, storing the preset playing file into a storage device and generating a log file. In addition, the BIOS includes a dynamic processing module, a file access module and a playing module. The dynamic processing module herein generates an accessing request sent to the file access module during booting the computer so that the file access module reads out the log file, acquires a preset playing file from the storage device according to the log file and sends the preset playing file to the playing module. In this way, the playing module would play the preset playing file during booting the computer.

The format-converting module is for converting a preset playing file into a file with a format executable by the playing module. The format-converting module can be located in the application system, in the BIOS or appended following the end of the preset playing file depending on different embodiments; the format-converting module can be also independently located in the storage device as a file type.

In regard to user operations, the present invention further provides a computer booting method, by which the computer would play different multimedia files depending on a selection mode according to the user's setting stored in the log file whenever booting the computer. In this way, the user would enjoy the booting frame featuring a unique and colourful style of his own.

In an embodiment of the present invention, the above-mentioned multimedia file includes video file and/or audio file.

In addition, the above-mentioned storage device can be a hard disk, a flash memory or other storage devices recognizable by the OS.

In the present invention, since the preset playing file is stored in the storage device, so that the present invention allows a user to preset a plurality of multimedia files as the preset playing files. In addition, the employed format-converting module enables the computer to display a full-color video frame with the highest resolution supportable by DOS or other similar OSs (for example, FreeDOS) whenever booting the computer.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
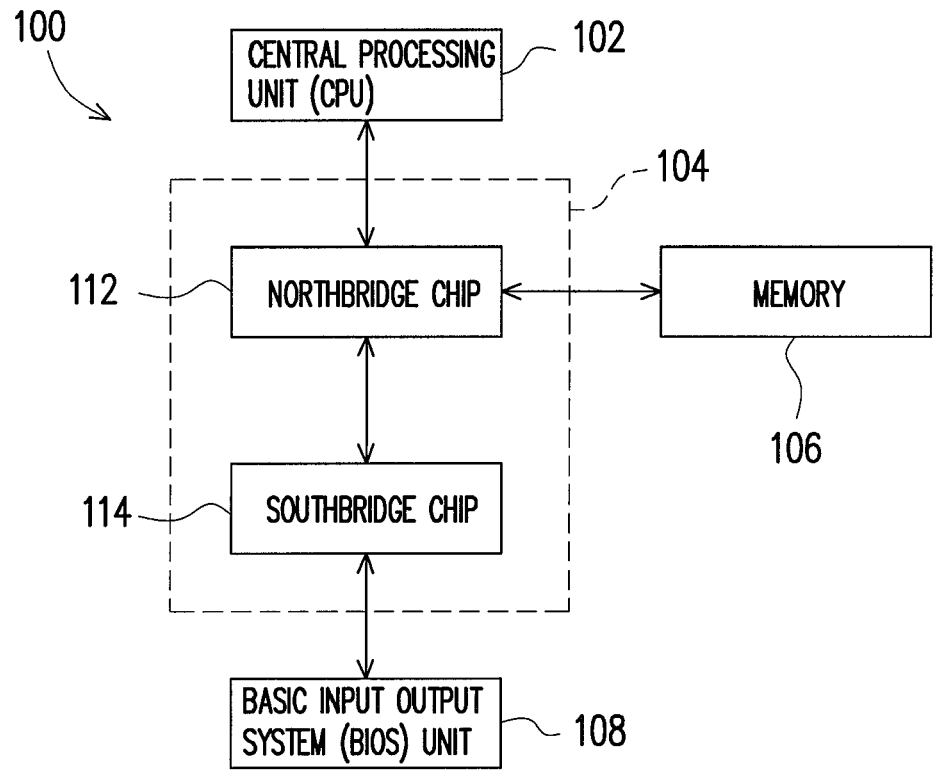
FIG. 1A is a block diagram showing an architecture of a conventional computer.
Figure 1B:
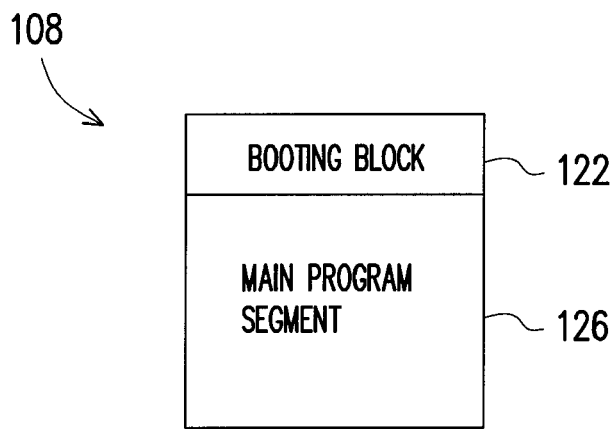
FIG. 1B is a block diagram showing an architecture of a conventional basic input output system (BIOS).

Reference will now be made in detail to the present preferred embodiments of the invention, examples of which are illustrated in the accompanying drawings. Wherever possible, the same reference numbers are used in the drawings and the description to refer to the same or like parts.

Figure 2:
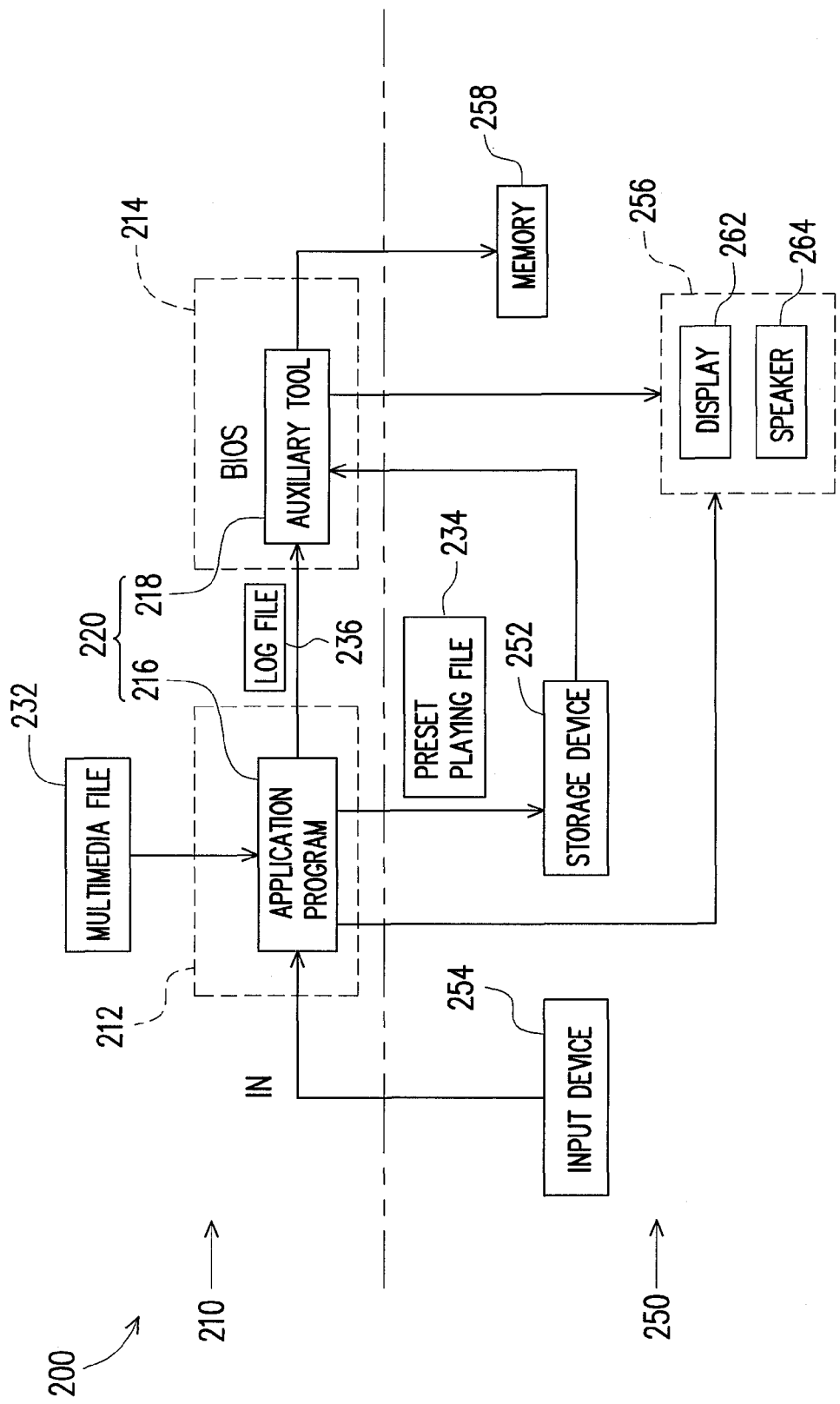
FIG. 2 is a system block diagram of a computer according to an embodiment of the present invention.

FIG. 2 is a system block diagram of a computer according to an embodiment of the present invention. Referring to FIG. 2, a computer 200 provided by the embodiment includes a system layer 210 and a hardware layer 250. The system layer 210 herein includes an OS 212 and a BIOS 214. The hardware layer 250 includes a storage device 252, an input device 254, an output device 256 and a memory 258. In the embodiment the storage device 252 can be a hard disk, a flash memory or other storage devices recognizable by the OS.

An application program 216 is installed in the OS 212 of the computer 200, and in addition, the BIOS 214 further includes an auxiliary tool 218. In the embodiment, the application program 216 and the output device 256 together form an application system 220, which enables the output device 256 to play a user-defined multimedia file 232 during booting the computer 200. In general, the output device 256 can include a display 262 and a speaker 264. In the embodiment, the auxiliary tool 218 can be a program segment compiled within the main program segment of the BIOS 214.

Figure 3A:
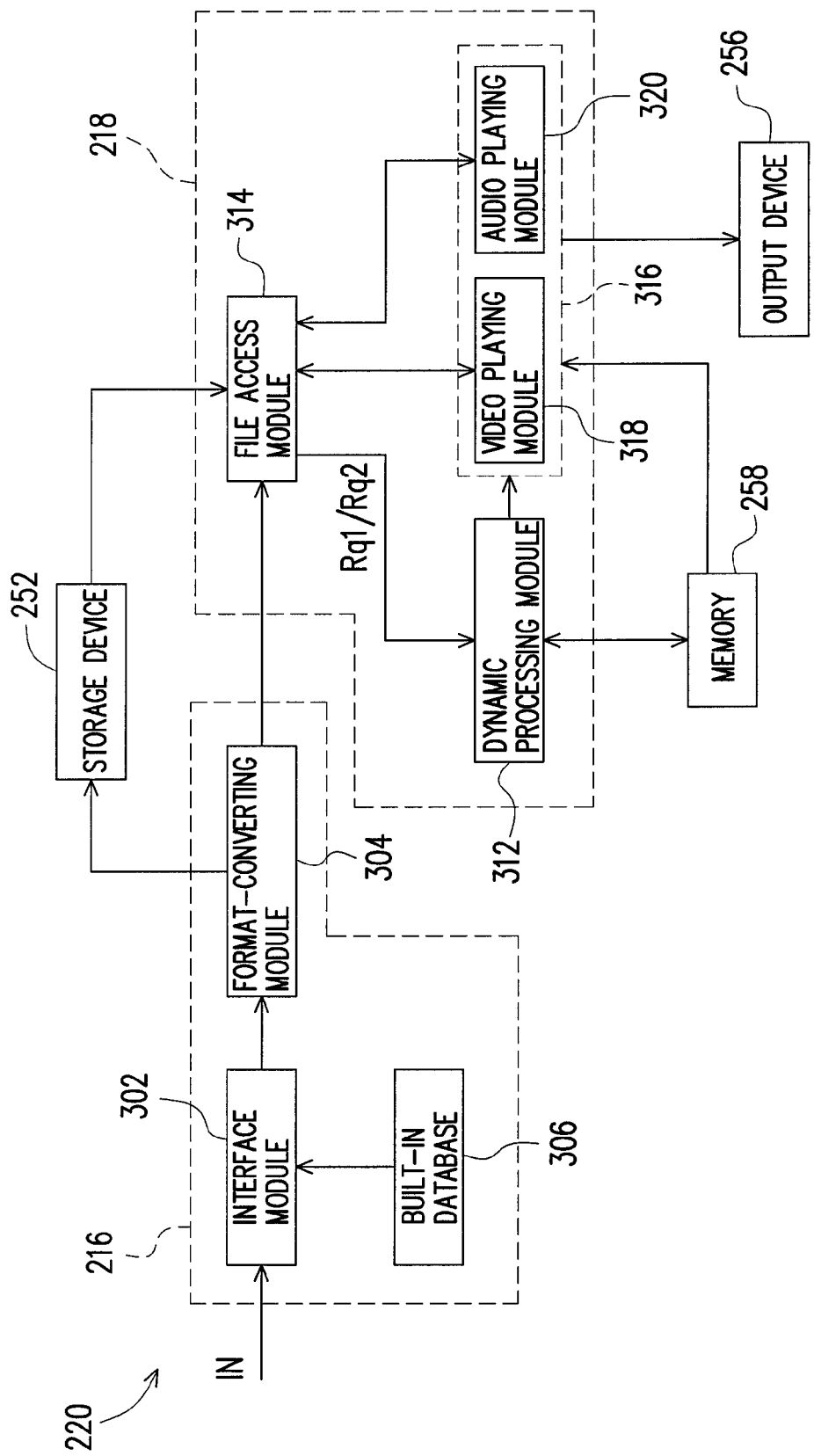
FIG. 3A is a system block diagram of an application system, a storage device, a memory and an output device in a computer according to the first embodiment of the present invention.

FIG. 3A is a system block diagram of an application system, a storage device, a memory and an output device in a computer according to the fourth embodiment of the present invention. Referring to FIGS. 2 and 3A, a format-converting module 304 is located within the application program in the embodiment, so that the application program 216 includes an interface module 302 and the format-converting module 304. In some optional embodiments, the application program 216 further includes a built-in database 306 for storing a plurality of sample multimedia files. The interface module 302 herein can display an operation window on the display 262, and the user can manipulate the input device 254 to generate an input instruction IN sent to the interface module 302 so as to operate the operation window. The input device 254 can be a mouse, a keyboard or other input devices recognizable by the OS. When the interface module 302 receives the input instruction IN, at least a multimedia file 232 is selected as a preset playing file 234 according to the input instruction IN, and the preset playing file 234 is sent to the format-converting module 304.

The multimedia file 232 can be, for example, video files and/or audio files stored in the storage device 252 or sample multimedia files originally stored in the built-in database 306. Since the computer 200 only display an image with a resolution equal to or less than a preset resolution (for example, 1024×768) in the DOS environment or other similar OS environments (for example, FreeDOS environment), the format-converting module 304 would convert the preset playing file 234 into a file with a format executable by the playing module 316 so as to conform with the resolution requirement by Dos environment or other similar OS environments (for example, FreeDOS environment), wherein the preset playing file 234 is just the video file selected by the user. Once the format of the preset playing file 234 has been converted, the format-converting module 304 stores the preset playing file 234 into the storage device 252 and furthermore generate a log file 236 based on the storage position thereof. As a result, there are both the preset playing file 234 and the log file 236 in the storage device 252, as shown in FIG. 2.

Continuing to FIGS. 2 and 3A, the operation window provided by the interface module 302 further allows a user for some settings in addition to allowing the user to select a preferred multimedia file 232. In the embodiment, the interface module 302 provides the user with setting some scene modes and setting some playing modes, which are explained in details hereinafter. After the user completes the settings, the settings would be recorded in the log file 236.

An auxiliary tool 218 includes a dynamic processing module 312, a file access module 314 and a playing module 316. The dynamic processing module 312 and the playing module 316 are both coupled to the file access module 314 and both coupled to the memory 258. In the embodiment, the memory 258 can be a volatile memory or a powered-on volatile memory, for example, a random access memory (RAM), a synchronous RAM, a dual core RAM and the like.

When booting the computer 200, the BIOS 214 is executed at first. Meanwhile, the dynamic processing module 312 sends a reading request Rq1 to the file access module 314, so that the file access module 314 reads out the log file 236, followed by sending back the log file 236 to the dynamic processing module 312. Once the dynamic processing module 312 receives the log file 236, an accessing request Rq2 is sent to the file access module 314, so that the file access module 314 acquires the preset playing file 234 from the storage device 252, followed by sending the preset playing file 234 to the dynamic processing module 312.

When the dynamic processing module 312 receives the preset playing file 234, the preset playing file 234 would be registered in the memory 258 and the registered address in the memory 258 is informed to the playing module 316. The playing module 316 includes a video playing module 318 and an audio playing module 320. When the playing module 316 receives the message from the dynamic processing module 312, the playing module 316 reads the preset playing file 234 from the memory 256 and plays the file 234 by using the output device 256 during booting the computer 200.

Figure 3B:
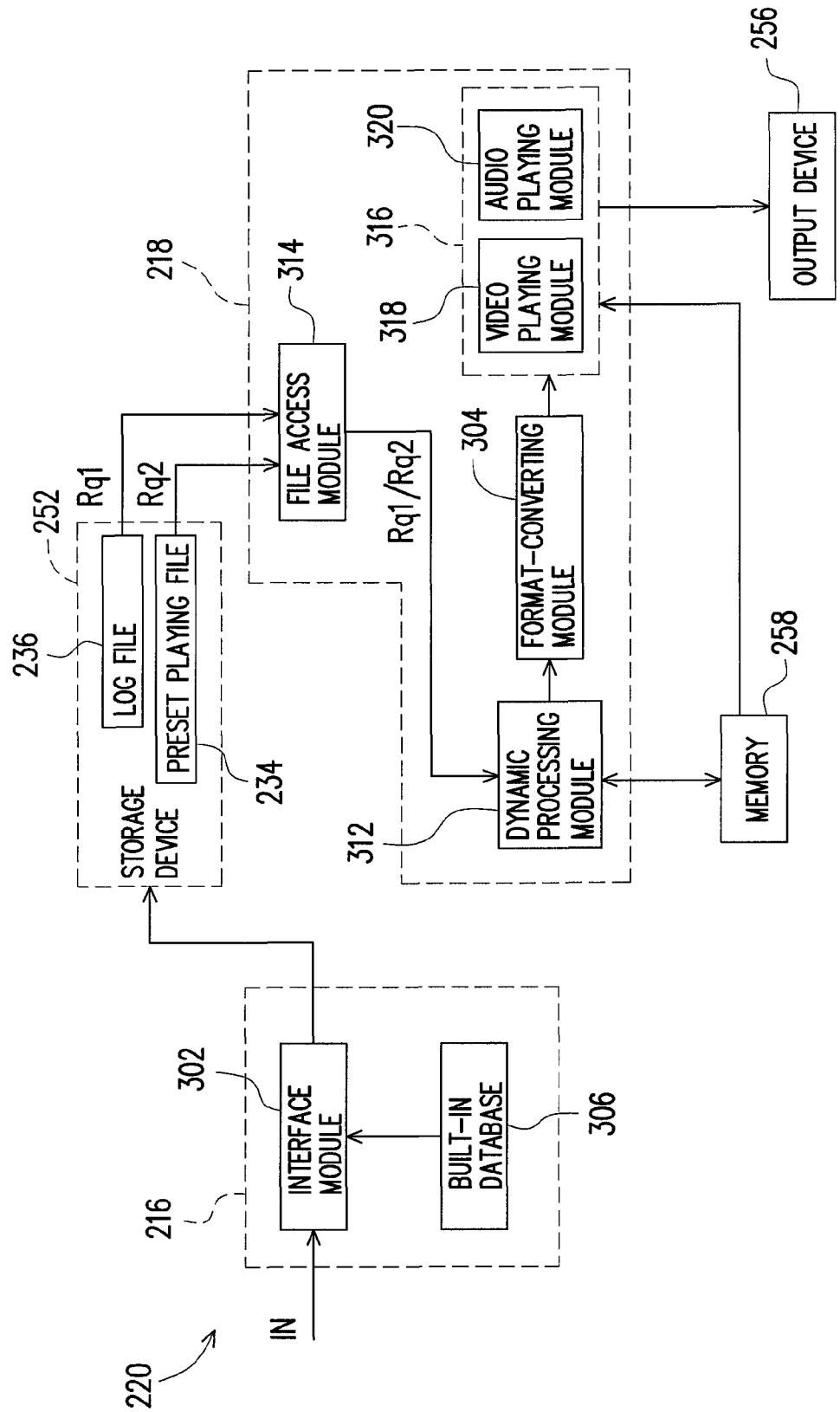
FIG. 3B is a system block diagram of an application system, a storage device, a memory and an output device in a computer according to the second embodiment of the present invention.

FIG. 3B is a system block diagram of an application system, a storage device, a memory and an output device in a computer according to the second embodiment of the present invention. Referring to FIGS. 2 and 3B, the difference of the embodiment of FIG. 3B from that of FIG. 3A rests that the format-converting module 304 of the embodiment can be installed in the BIOS 214. Therefore, the application program 216 directly stores the preset playing file 234 into the storage device 252 without any format converting and then generates the log file 236 according to the storage position. After that, the file access module 314 acquires the preset playing file 234 from the storage device 252 through the log file 236 and registers the file 234 into the memory 258. In addition, the file access module 314 informs the format-converting module 304 of the registered address in the memory 258, so that the format-converting module 304 converts the preset playing file 234 into a file with a format executable by the playing module 316 and then sends back the converted file 234 to the dynamic processing module 312.

Figure 3C:
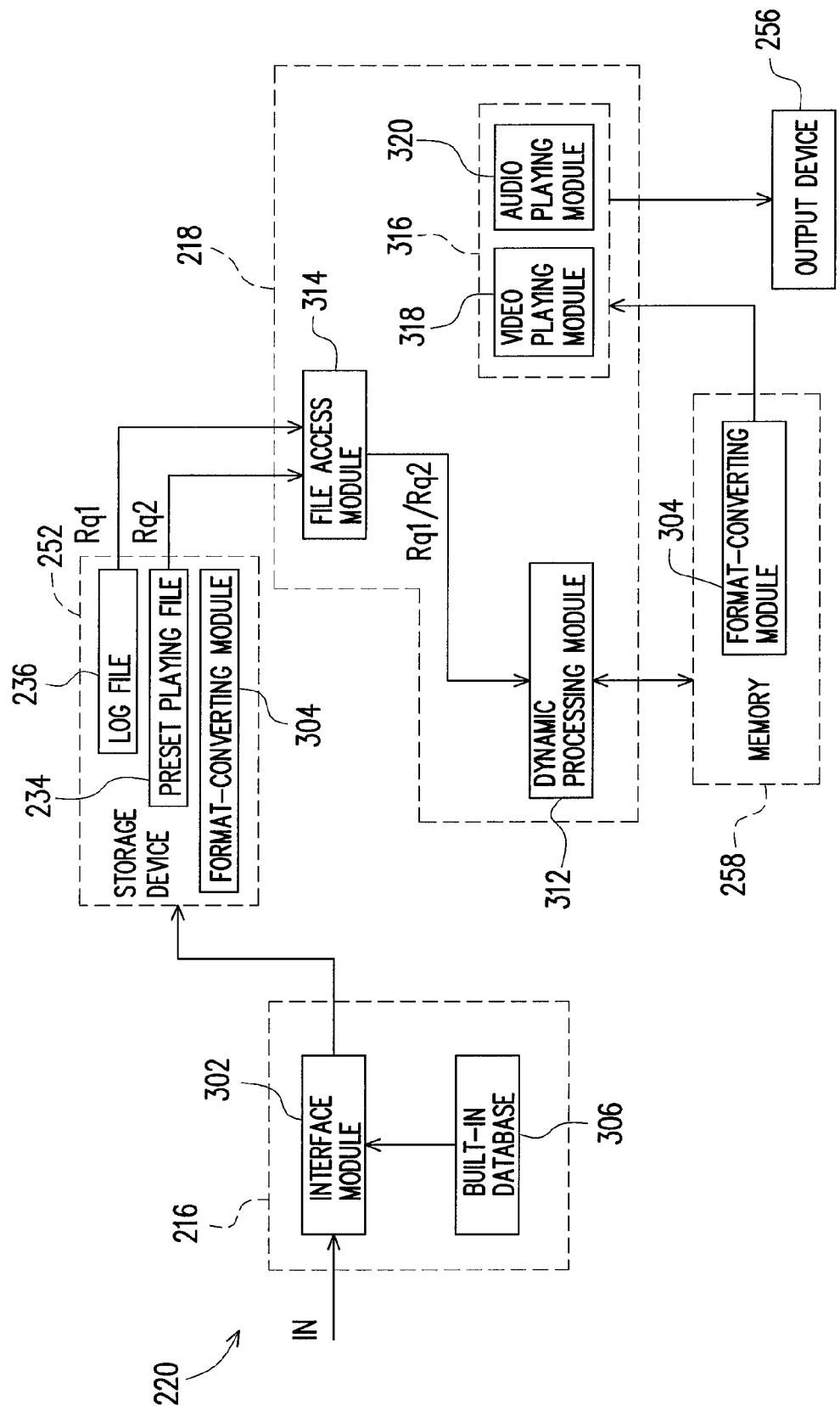
FIG. 3C is a system block diagram of an application system, a storage device, a memory and an output device in a computer according to the third embodiment of the present invention.

FIG. 3C is a system block diagram of an application system, a storage device, a memory and an output device in a computer according to the third embodiment of the present invention. Referring to FIGS. 2 and 3C, the difference of the embodiment of FIG. 3C from that of FIGS. 3A and 3B rests that the format-converting module 304 of the embodiment can be set following the end of the preset playing file 234. Therefore, the application program 216 directly combines the preset playing file 234 and the format-converting module 304 together and stores the combined one into the storage device 252 without any format converting and then generates the log file 236 according to the storage position. After that, the file access module 314 acquires the preset playing file 234 and the format-converting module 304 from the storage device 252 through the log file 236 and registers them into the memory 258. Similarly, the file access module 314 informs the format-converting module 304 of the address of the preset playing file 234 in the memory 258, so that the format-converting module 304 converts the preset playing file 234 into a file with a format executable by the playing module 316 and then sends back the converted file 234 to the dynamic processing module 312.

Figure 3D:
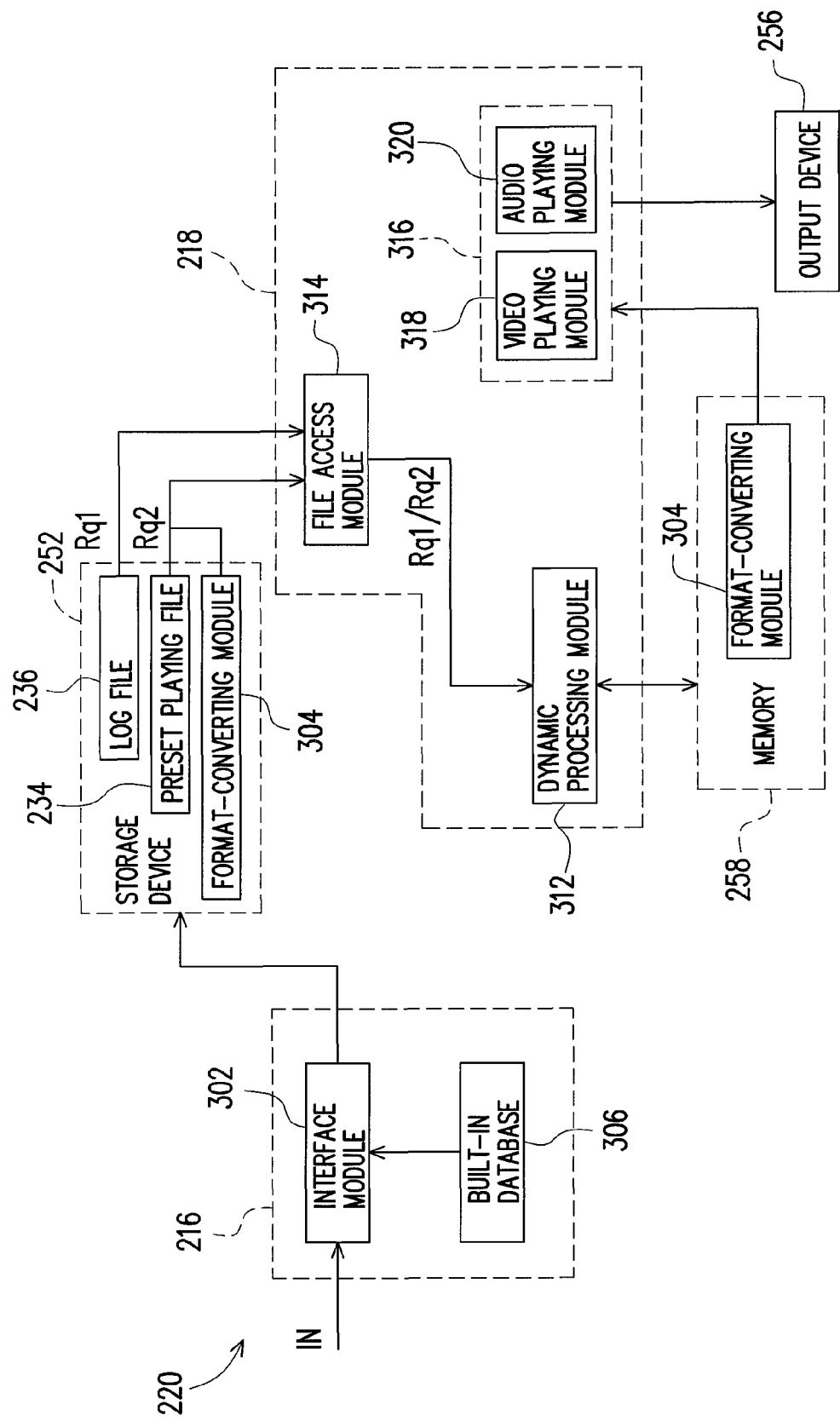
FIG. 3D is a system block diagram of an application system, a storage device, a memory and an output device in a computer according to the fourth embodiment of the present invention.

FIG. 3D is a system block diagram of an application system, a storage device, a memory and an output device in a computer according to the fourth embodiment of the present invention. Referring to FIGS. 2 and 3D, the difference of the embodiment of FIG. 3D from that of FIGS. 3A, 3B and 3C rests that the format-converting module 304 in the embodiment serves as a file and is independently stored in the storage device 252, so that the application program 216 can directly save the preset playing file 234 and the format-converting module 304 into the storage device 252 and generates a log file 236 according to the storage positions, wherein both the preset playing file 234 and the format-converting module 304 are treated as files. After that, the file access module 314 acquires the preset playing file 234 and the format-converting module 304 from the storage device 252 through the log file 236 and registers them into the memory 258. Similarly, the file access module 314 informs the format-converting module 304 of the address of the preset playing file 234 in the memory 258, so that the format-converting module 304 converts the preset playing file 234 into a file with a format executable by the playing module 316 and then sends back the converted file 234 to the dynamic processing module 312.

Besides, in some embodiments, the log file 236 and the preset playing file 234 in FIG. 2 can be two files independent from each other or a combined file. If they are two files independent from each other, the access path of the preset playing file 234 in the storage device 252 is recorded in the memory 258; if they are a combined file, the relative address of the preset playing file in the combined file would be as a header and recorded in the log file 236, and the preset playing file 234 is as a file body.

Figure 4A:
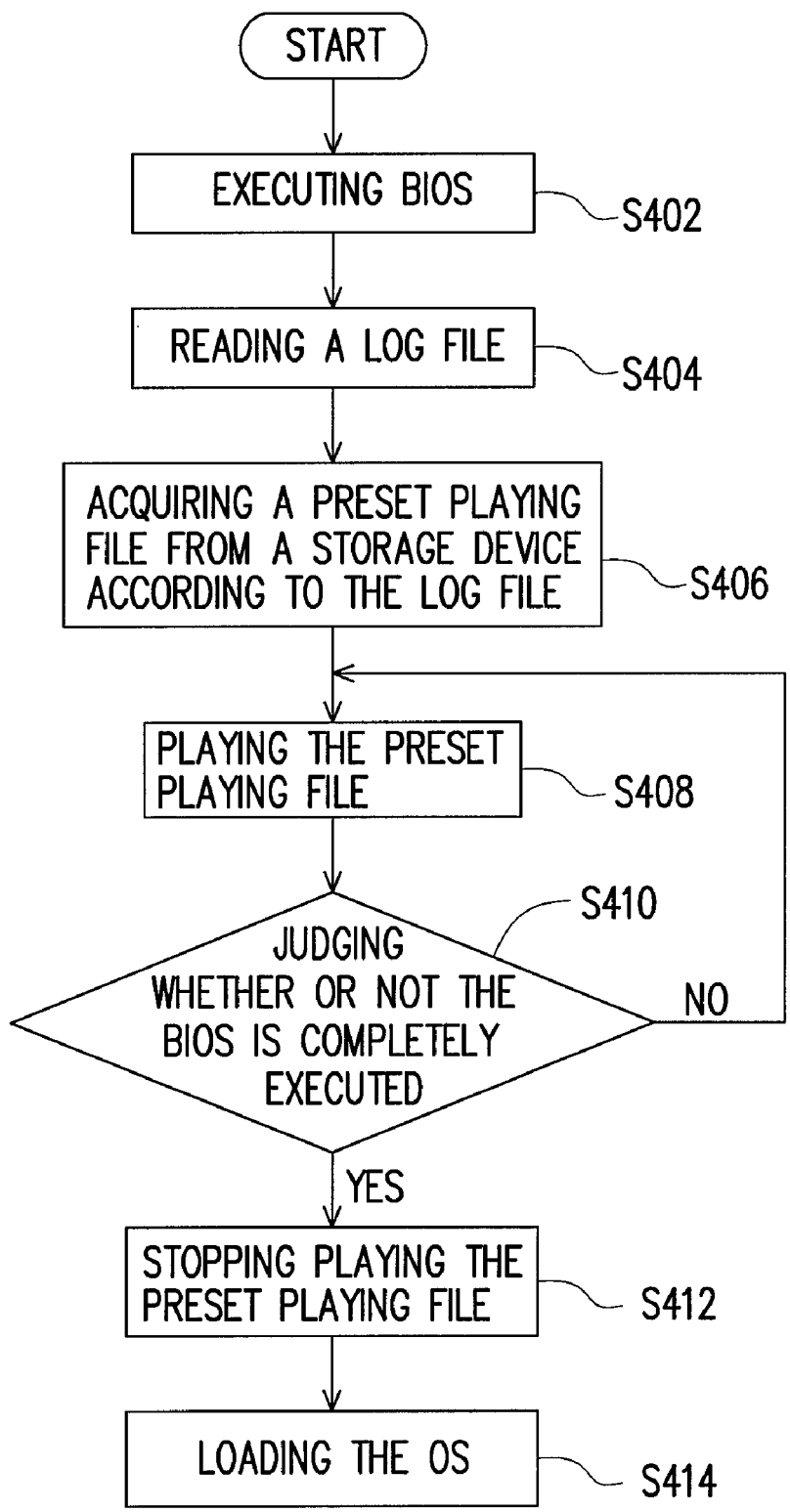
FIG. 4A is a flowchart showing the steps of a computer booting method according to the first embodiment of the present invention.

By summarising the above described, the booting method of the present invention can be depicted as follows. FIG. 4A is a flowchart showing the steps of a computer booting method according to the first embodiment of the present invention, which is corresponding to FIG. 3A. Referring to FIGS. 3A and 4A, when a computer is started, in step S402 first, a BIOS is executed. In other embodiments, in step S404 following step S402, a log file is read out. In step S406, a preset playing file is acquired from a storage device according to the log file. The preset playing file can be a multimedia data, for example, a video file or/and an audio file. The storage device can be a hard disk, a flash memory or other storage devices recognizable by the OS.

After the storage device acquires the preset playing file, the method goes to step S408, where the preset playing file is played. The booting method provided by the present invention then goes to step S410, where it is judged whether or not the BIOS is completely executed. If the BIOS has not been executed completely (corresponding to 'NO' in step S410), step S408 would be repeated; if the BIOS has been executed completely (corresponding to 'YES' in step S410), the method goes to step S412, where playing the preset playing file is stopped, and then the OS is loaded as shown by step S414.

Figure 4B:
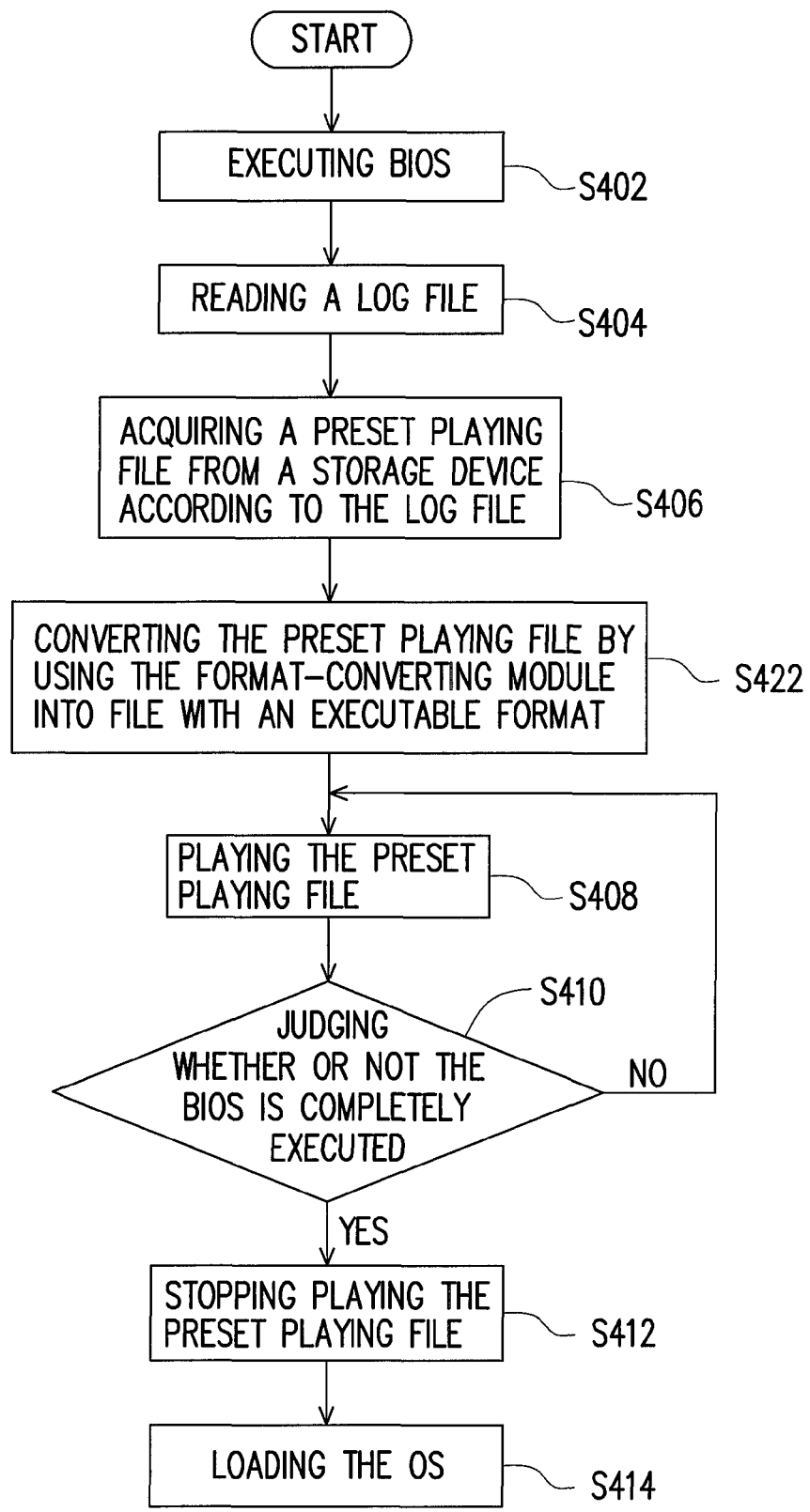
FIG. 4B is a flowchart showing the steps of a computer booting method according to the second embodiment of the present invention.

FIG. 4B is a flowchart showing the steps of a computer booting method according to the second embodiment of the present invention, which is corresponding to FIG. 3B. Referring to FIGS. 3B and 4B, the difference of the embodiment of FIG. 4B from that of FIG. 4A rests that after step S406, the method goes to step S422, where the file to be played is sent to the format-converting module 304 as shown in FIG. 3B to be converted into a file with a format executable by the playing module 316, and then the method goes to step S408.

Figure 4C:
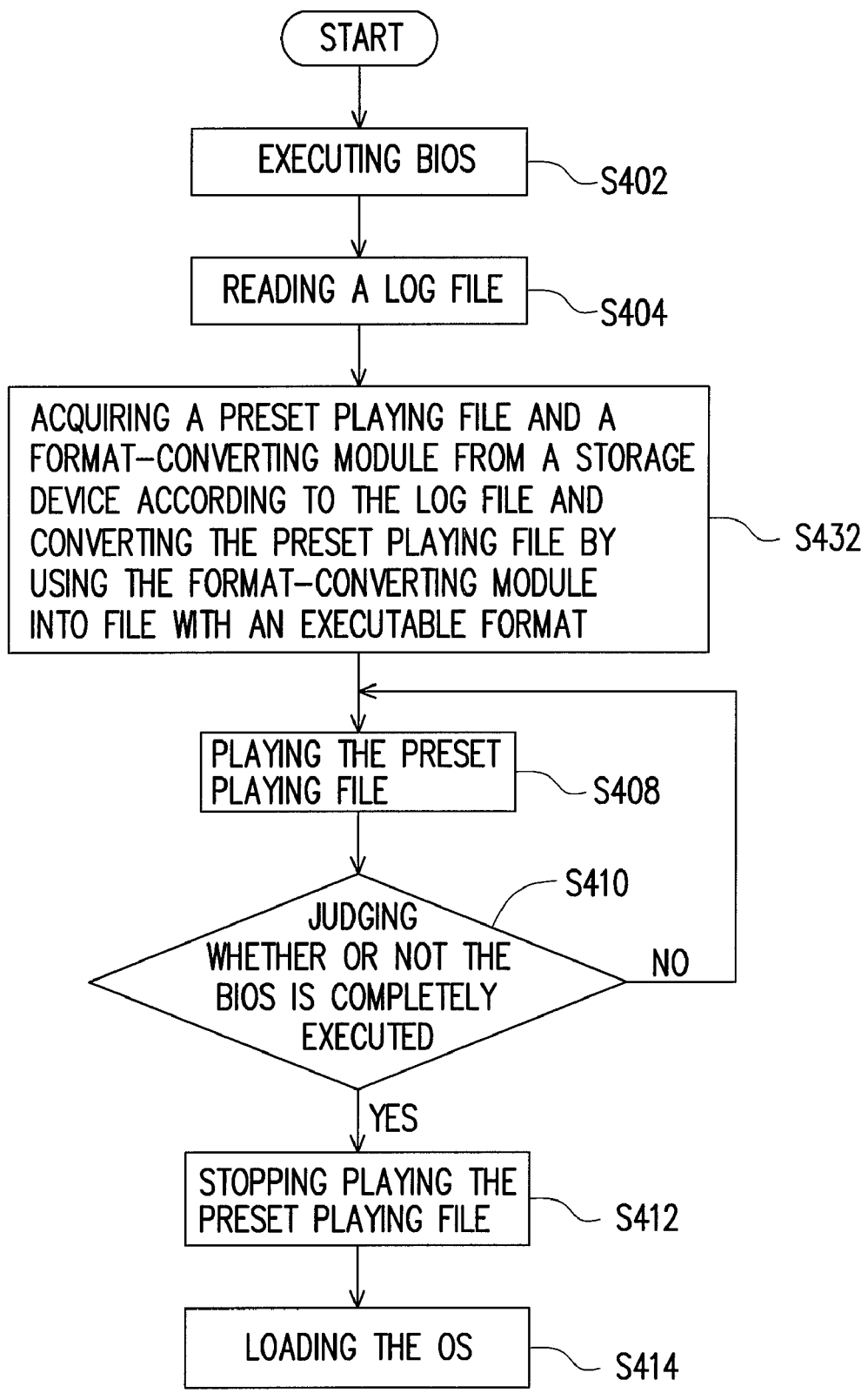
FIG. 4C is a flowchart showing the steps of a computer booting method according to the third and fourth embodiments of the present invention.

FIG. 4C is a flowchart showing the steps of a computer booting method according to the third and fourth embodiments of the present invention, which is corresponding to FIGS. 3C and 3D. Referring to FIGS. 3C, 3D and 4C, the difference of the embodiment of FIG. 4C from that of FIGS. 4A and 4B rests that after step S404, the method goes to step S432 rather than step S406, and in step S432, the preset playing file is acquired from a storage device according to the log file and, moreover, the format-converting module 304 shown in FIGS. 3C and 3D is acquired from the storage device. The file to be played is converted by the format-converting module 304 into a file with a format executable by the playing module 316, and then the method goes to step S408.

Figure 5A:
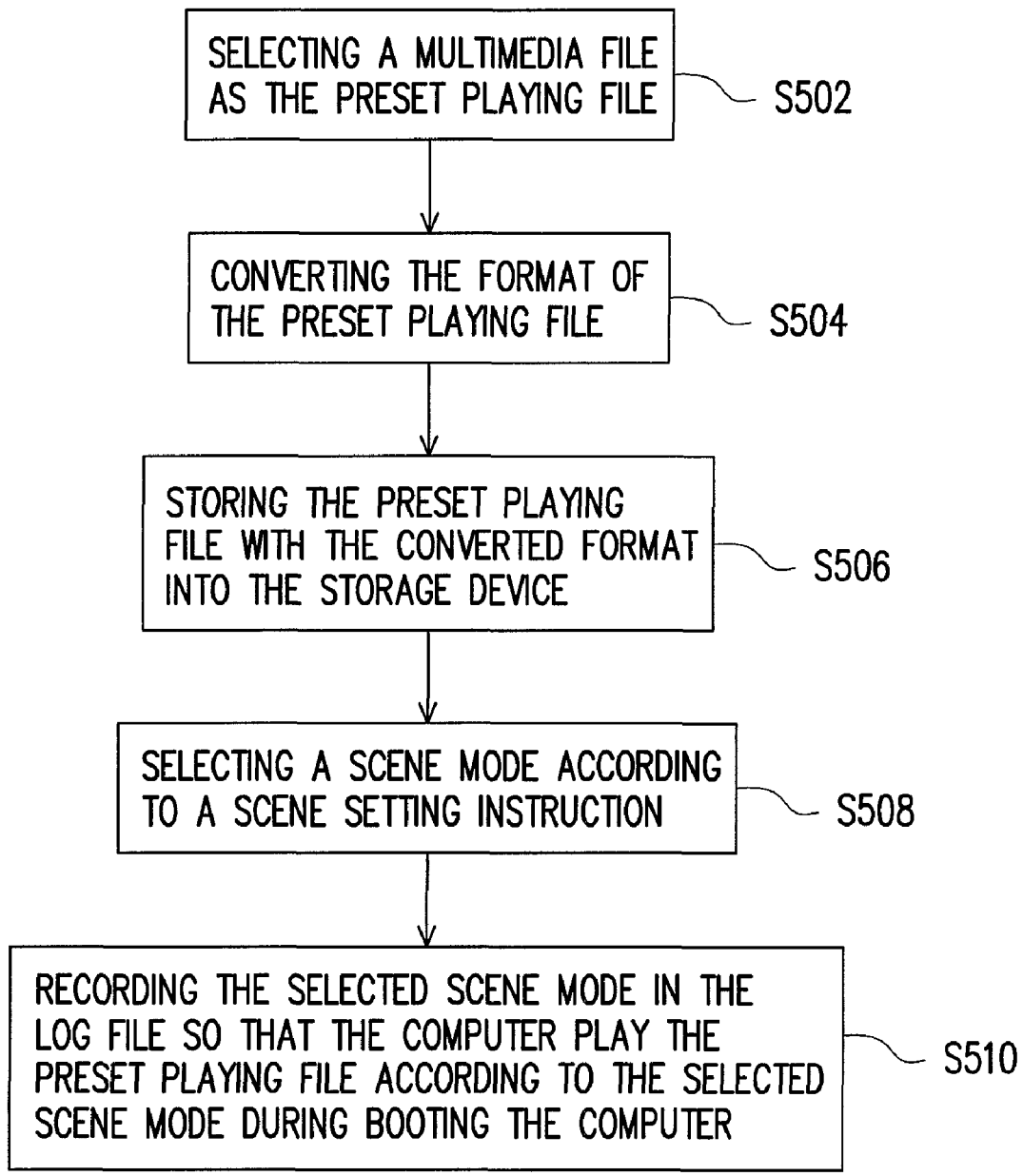
FIG. 5A is a flowchart showing the steps for a computer to generate a preset playing file and a log file according to the first embodiment of the present invention.

FIG. 5A is a flowchart showing the steps for a computer to generate a preset playing file and a log file according to the first embodiment of the present invention, which is corresponding to FIG. 4A. In the embodiment, first in step S502, a multimedia file is selected as the preset playing file. Next in step S504, the preset playing file is converted into that with a specified format, wherein the specified format is, for example, a format executable by the playing module. Then in step S506, the preset playing file with the converted format is stored into the storage device.

After step S506, the method goes to step S508, where a scene mode is selected from a plurality of scene modes according to a scene setting instruction. The scene modes provided by the embodiment include a background scene and a foreground scene. Further in step S510, the selected scene mode is recorded in the log file and the log file is stored in the storage device. In this way, during booting the computer, according to the embodiment, the computer can play a preset playing file according to the scene mode stored in the log file. The file path of the preset playing file can be recorded in the log file as well, which the embodiment is not limited to.

Figure 5B:
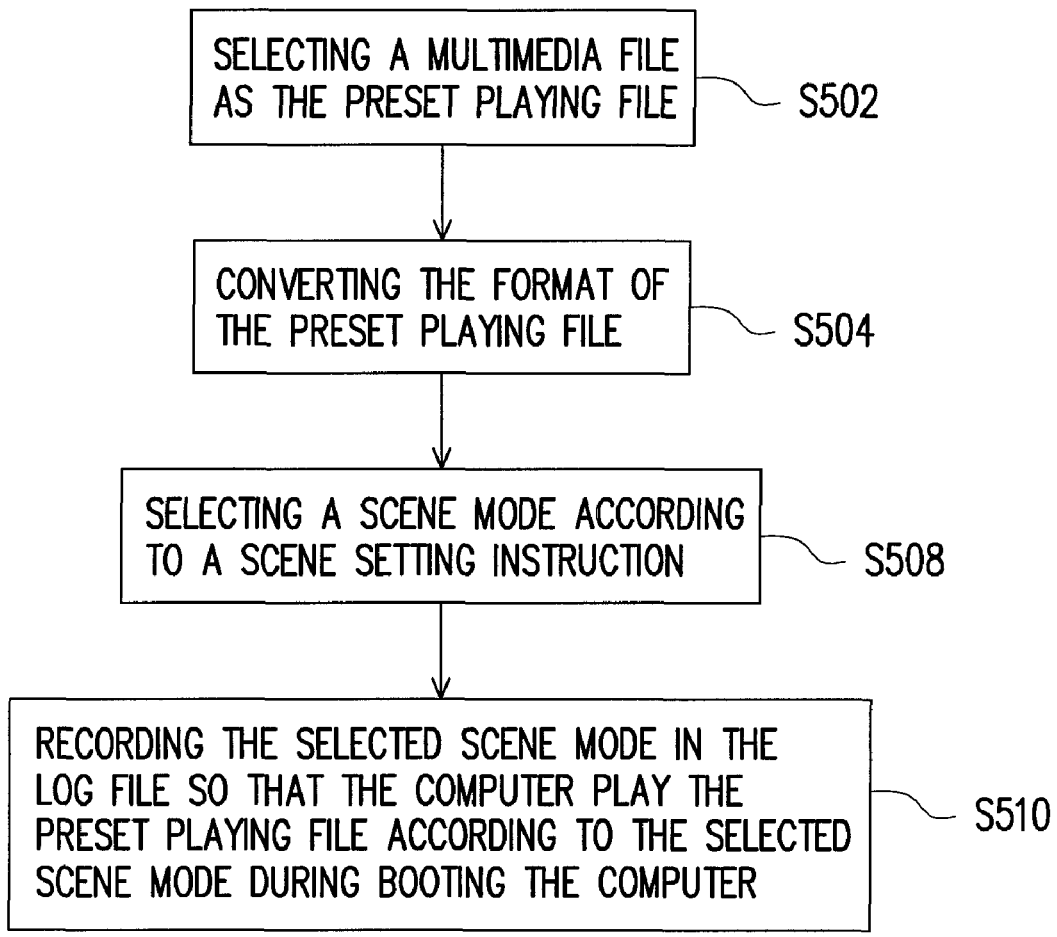
FIG. 5B is a flowchart showing the steps for a computer to generate a preset playing file and a log file according to the second embodiment of the present invention.

FIG. 5B is a flowchart showing the steps for a computer to generate a preset playing file and a log file according to the second embodiment of the present invention, which is corresponding to FIG. 4B. The difference of the embodiment of FIG. 5B from that of FIG. 5A rests that instead of steps S504 and S506, the embodiment of FIG. 5B takes step S522 to directly store the preset playing file without converting format into the storage device.

Figure 5C:
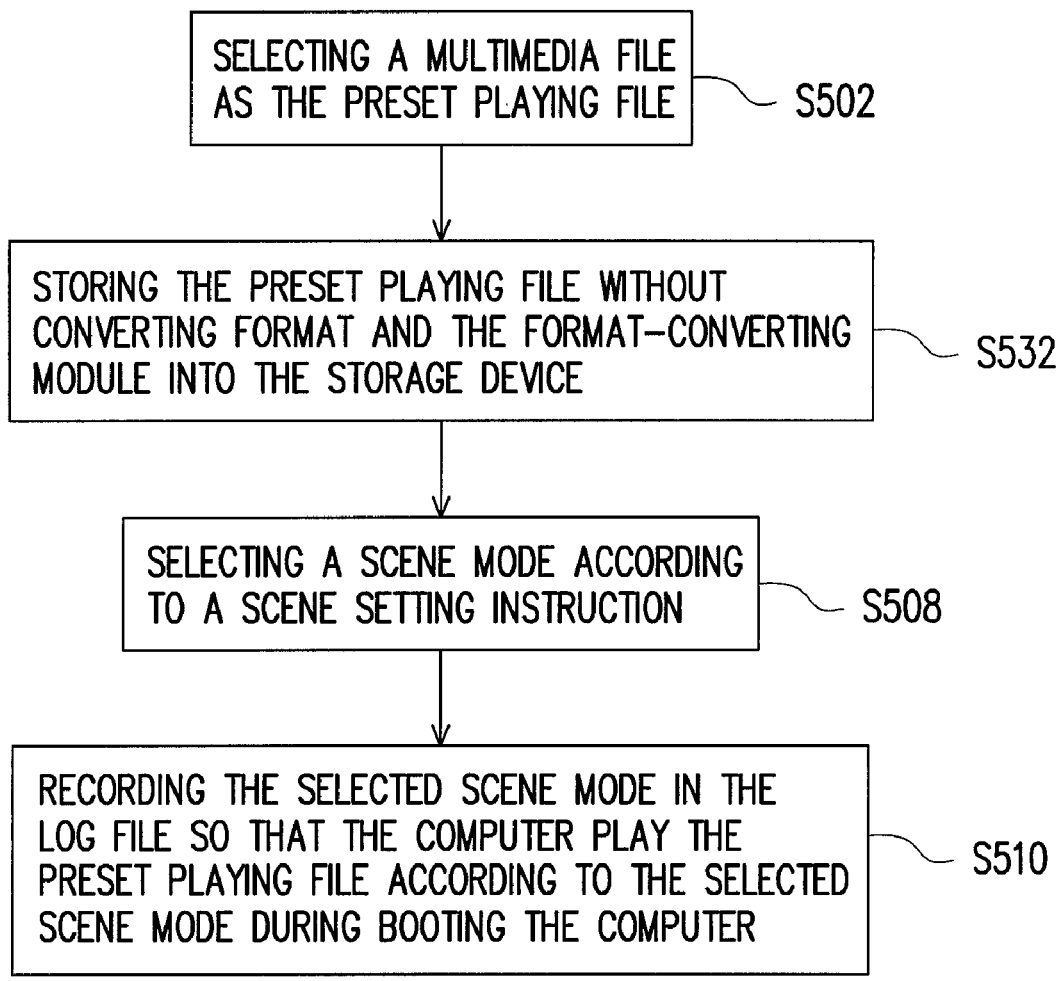
FIG. 5C is a flowchart showing the steps for a computer to generate a preset playing file and a log file according to the third and fourth embodiments of the present invention.

FIG. 5C is a flowchart showing the steps for a computer to generate a preset playing file and a log file according to the third and fourth embodiments of the present invention, which is corresponding to FIG. 4C. The difference of the embodiment of FIG. 5C from that of FIGS. 5A and 5B rests that instead of steps S504 and S506, the embodiment of FIG. 5C takes step S532 to directly store the preset playing file without converting format and the format-converting module 304 as shown in FIGS. 3C and 3D into the storage device, wherein the format-converting module 304 is treated as a file.

Figure 6A:
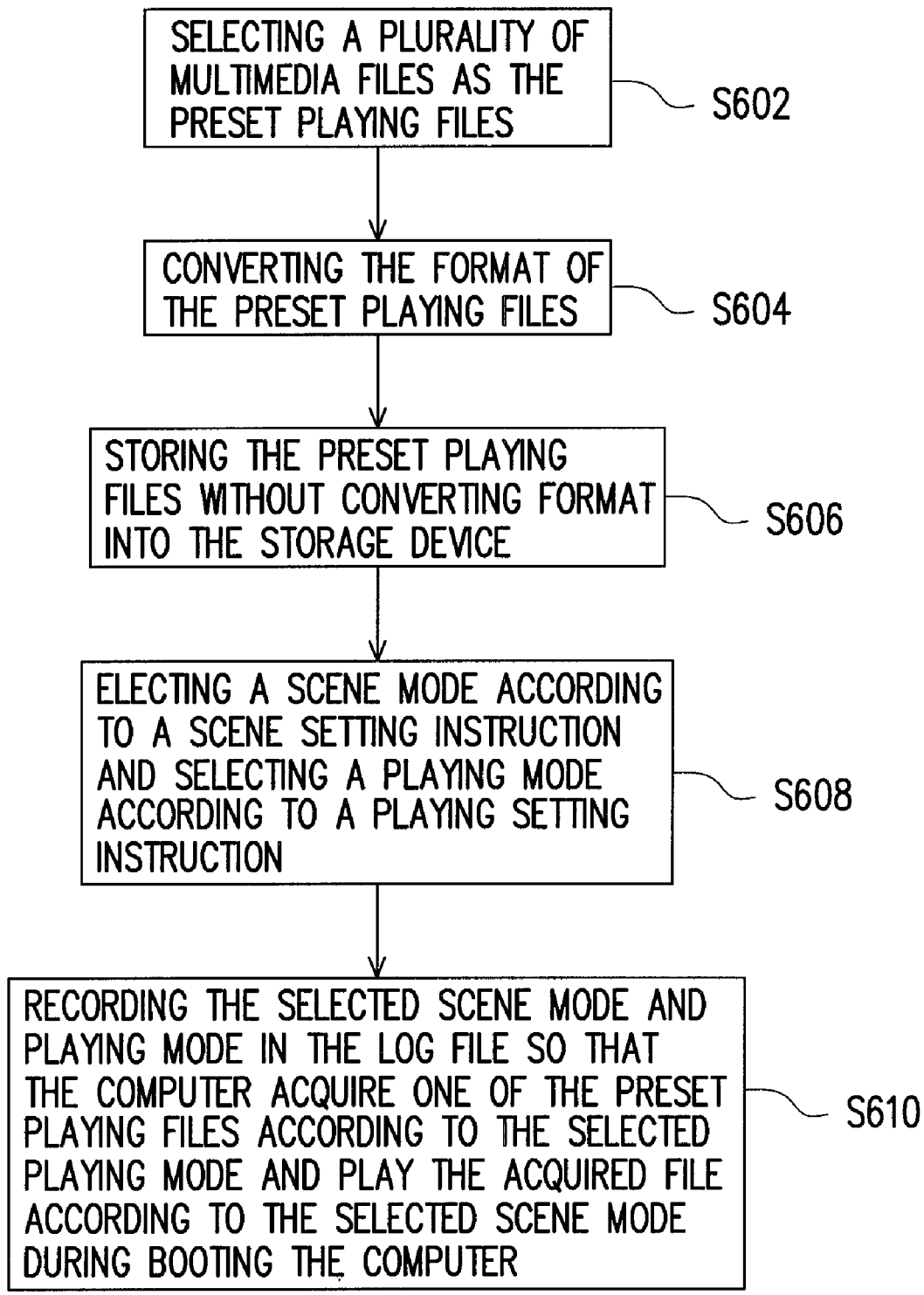
FIG. 6A is another flowchart showing the steps for a computer to generate a preset playing file and a log file according to the first embodiment of the present invention.

FIG. 6A is another flowchart showing the steps for a computer to generate a preset playing file and a log file according to the first embodiment of the present invention, which is corresponding to FIG. 5A. In the embodiment, first in step S602, a plurality of multimedia files is selected as the preset playing files. Next in step S604, the preset playing files are converted into a file with a format executable by the playing module. Then in step S606, the preset playing files with the converted format are stored in the storage device. After step S606, the method goes to step S608, where a scene mode is selected from a plurality of scene modes according to a scene setting instruction. In particular, in step S608 of the embodiment, a playing mode is further selected from a plurality of playing modes according to a playing setting instruction.

In the embodiment, since a user can specify a plurality of multimedia files as the preset playing files, so that the present invention can provide 'specified playing', 'sequentially playing' or 'randomly playing' for a user to select. In step S610, the scene mode and the playing mode and the file path of the preset playing files can be recorded in the log file and the log file is recorded in the storage device. In this way, during booting the computer, one of the stored preset playing files is acquired according to the playing mode recorded in the log file for playing by using the selected scene mode.

Figure 6B:
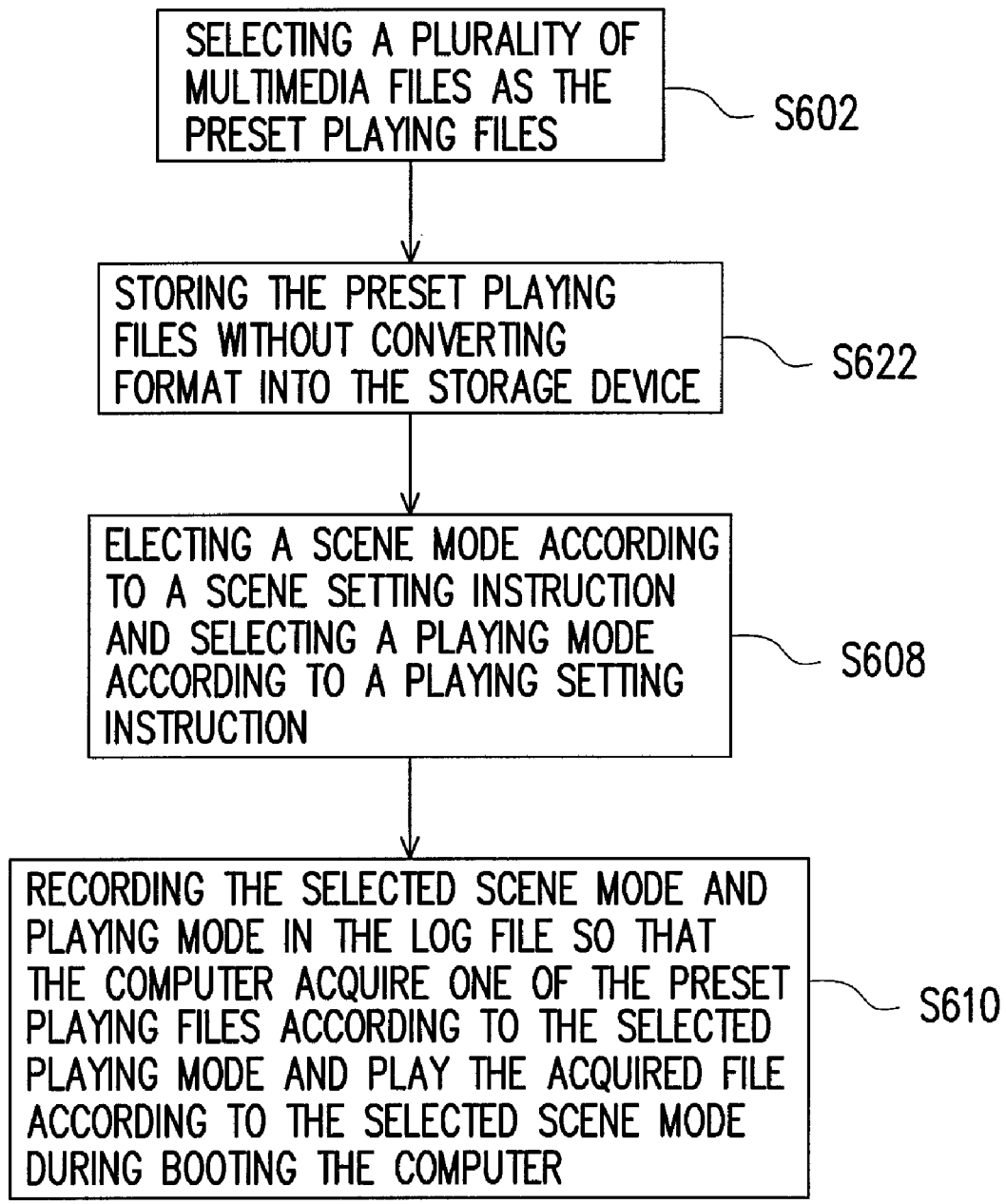
FIG. 6B is another flowchart showing the steps for a computer to generate a preset playing file and a log file according to the second embodiment of the present invention.

FIG. 6B is another flowchart showing the steps for a computer to generate a preset playing file and a log file according to the second embodiment of the present invention, which is corresponding to FIG. 5B. The difference of the embodiment of FIG. 6B from that of FIG. 6A rests that after step S602, the method goes to step S622 instead of going to steps S604 and S606, where the preset playing files without converting format are stored into the storage device.

Figure 6C:
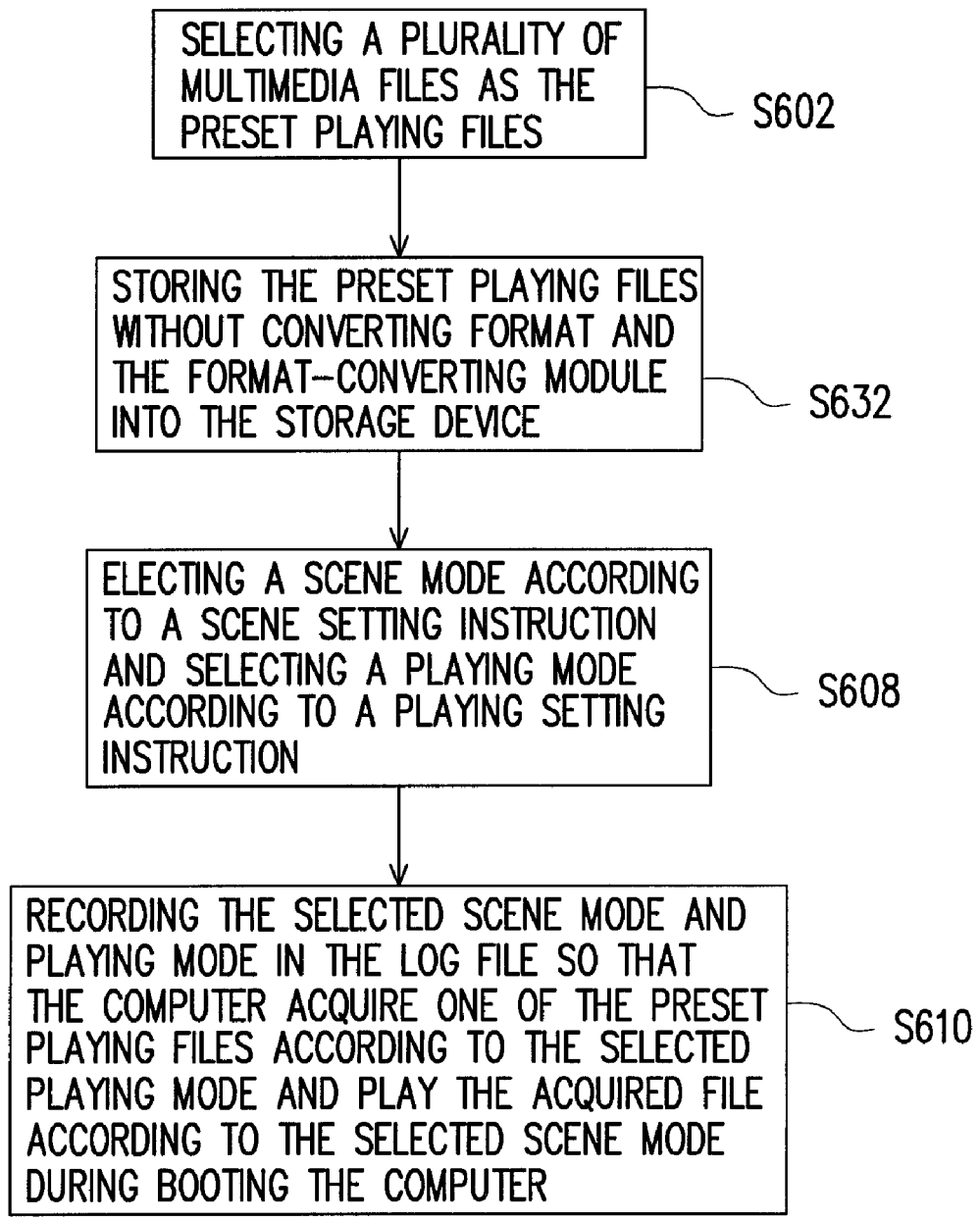
FIG. 6C is another flowchart showing the steps for a computer to generate a preset playing file and a log file according to the third and fourth embodiments of the present invention.

FIG. 6C is another flowchart showing the steps for a computer to generate a preset playing file and a log file according to the third and fourth embodiments of the present invention, which is corresponding to FIG. 5C. The difference of the embodiment of FIG. 6C from that of FIGS. 6A and 6B rests that after step S602, the method goes to step S632 instead of going to steps S604 and S606, where the preset playing files without converting format and the format-converting module 304 as shown in FIGS. 3C and 3D are stored into the storage device, wherein the format-converting module 304 is treated as a file.

In summary, the present invention, the preset playing file is stored in storage device such as a hard disk or a USB flash disk, which is recognizable by an OS, therefore, the present invention allows a user to select a plurality of multimedia files as the preset playing files. In addition, the present invention has a format-converting module for converting the preset playing files into a file with a format executable by the playing module, so that the present invention enables the computer to display a full-color video frame with the highest resolution (1048×768) supportable by DOS or other similar OSs (for example, FreeDOS) whenever booting the computer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer, comprising:
   an application system, for setting a multimedia file as a preset playing file according to an input instruction and storing the preset playing file into a storage device, wherein the application system further generates a log file according to the input instruction and a storage position of the preset playing file;
   a storage device, coupled to the application system for storing the preset playing file;
   a basic input output system, coupled to the application system for executing a booting procedure whenever booting the computer and acquiring the preset playing file from the storage device according to the content of the log file during executing the booting procedure so as to play the preset playing file during booting the computer; and
   a format-converting module, executed by the basic input output system, the format-converting module comprises:
   converting the preset playing file into a file with a preset format, wherein the file with the preset format supports a resolution which is supported by an operating system of the computer whenever the computer is booted.

2. The computer according to claim 1, further comprising a memory for registering the preset playing file while the basic input output system is acquiring the preset playing file.

3. The computer according to claim 1, wherein the storage device is a hard disk.

4. The computer according to claim 1, wherein the storage device is a flash memory.

5. The computer according to claim 1, wherein the multimedia file is a video multimedia file.

6. The computer according to claim 1, wherein the multimedia file is an audio multimedia file.

7. A non-transitory booting software product installed in a computer and executed by the computer, the non-transitory booting software product comprises:
an interface module, for setting at least a multimedia file as a preset playing file according to an input instruction and generating a log file, wherein the preset playing file is located in a storage device;
a dynamic processing module, installed in a basic input output system of the computer for generating an accessing request whenever booting the computer;
a file access module, installed in the basic input output system of the computer for reading the log file and acquiring the preset playing file storage device according to the log file when receiving the accessing request;
a playing module, installed in the basic input output system of the computer and coupled to the dynamic processing module for playing the preset playing file during booting the computer; and
a format-converting module, coupled to one of the interface module, the file access module and the storage device for converting the preset playing file into a file with a preset format, wherein the file with the preset format supports a resolution which is supported by an operating system of the computer whenever the computer is booted.

8. The non-transitory booting software product according to claim 7, further comprising a built-in database, coupled to the interface module and storing a plurality of sample multimedia files for selecting the preset playing file among the sample multimedia files.

9. The non-transitory booting software product according to claim 7, wherein the multimedia file is a video multimedia file or an audio multimedia file.

10. The non-transitory booting software product according to claim 7, wherein the storage device is a hard disk or a flash memory.

11. The non-transitory booting software product according to claim 7, wherein the playing module comprises a video playing module and an audio playing module.

12. The non-transitory booting software product according to claim 7, wherein the dynamic processing module further registers the preset playing file acquired by the file access module into a memory.

13. A computer booting method, comprising:
executing a basic input output system of a computer;
reading a log file;
acquiring a preset playing file from a storage device according to the log file;
converting the preset playing file into a file with a preset format, wherein the file with the preset format supports a resolution which is supported by an operating system of the computer whenever the computer is booted;
playing the file with the preset format; and
loading the operating system.

14. The computer booting method according to claim 13, further comprising:
when the basic input output system is executed completely, stopping playing the preset playing file.

15. The computer booting method according to claim 13, further comprising:
selecting a multimedia file as the preset playing file;
storing the preset playable file into the storage device;
selecting one of a plurality of scene modes according to a scene setting instruction; and
recording the selected scene mode into the log file so as to play the preset playing file according to the selected scene mode during booting the computer.

16. The computer booting method according to claim 15, wherein each of the scene modes comprises a background and a foreground of a frame.

17. The computer booting method according to claim 13, further comprising:
selecting a plurality of multimedia files as the preset playing files;
storing the preset playable files into the storage device;
selecting one of a plurality of scene modes according to a scene setting instruction;
selecting one of a plurality of playing modes according to a playing setting instruction; and
recording the selected scene mode and playing mode into the log file so as to acquire one of the preset playing files according to the selected playing mode and to play the acquired preset playing file according to the selected scene mode during booting the computer.

18. The computer booting method according to claim 17, wherein the playing mode comprises 'specified playing', 'sequentially playing' and 'randomly playing'.

19. The computer booting method according to claim 13, wherein the preset playing file is a video file or an audio file.

* * * * *

UNITED STATES PATENT AND TRADEMARK OFFICE
CERTIFICATE OF CORRECTION

PATENT NO. : 8,261,051 B2  Page 1 of 1
APPLICATION NO. : 12/507803
DATED : September 4, 2012
INVENTOR(S) : Chen-Chin Kuo et al.

It is certified that error appears in the above-identified patent and that said Letters Patent is hereby corrected as shown below:

On the Title page of the patent grant, the item (73) Assignee's Name "ASUSTek COMPUTER Inc." should be changed to --ASUSTeK COMPUTER INC.--.

Signed and Sealed this
Twentieth Day of November, 2012

David J. Kappos
*Director of the United States Patent and Trademark Office*